(12) United States Patent
Weber

(10) Patent No.: US 11,827,180 B2
(45) Date of Patent: Nov. 28, 2023

(54) CARGO HOLD ARRANGEMENT FOR A FRONT CHAMBER OF A MOTOR VEHICLE THAT CAN BE CLOSED BY A FRONT BONNET

(71) Applicant: Mercedes-Benz Group AG, Stuttgart (DE)

(72) Inventor: Hanno Weber, Kirchheim/Teck (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 17/774,077

(22) PCT Filed: Oct. 29, 2020

(86) PCT No.: PCT/EP2020/080358
§ 371 (c)(1),
(2) Date: May 3, 2022

(87) PCT Pub. No.: WO2021/094093
PCT Pub. Date: May 20, 2021

(65) Prior Publication Data

US 2022/0371519 A1    Nov. 24, 2022

(30) Foreign Application Priority Data

Nov. 13, 2019   (DE) .................... 10 2019 007 850.0

(51) Int. Cl.
*B60R 5/02*       (2006.01)
*B60R 21/34*      (2011.01)
*B62D 25/08*      (2006.01)

(52) U.S. Cl.
CPC ............... *B60R 5/02* (2013.01); *B60R 21/34* (2013.01); *B62D 25/087* (2013.01); *B60R 2021/343* (2013.01)

(58) Field of Classification Search
CPC ........... B60R 5/02; B60R 5/044; B60R 21/34; B60R 2021/343; B62D 25/087; B62D 25/105; B62D 25/12
(Continued)

(56) References Cited

U.S. PATENT DOCUMENTS 8,388,047 B2 *   3/2013   Schmidt ............... B62D 25/087
                                                296/203.02
8,486,173 B2     7/2013   Fikany et al.
(Continued)

FOREIGN PATENT DOCUMENTS

CN        107433911 A   * 12/2017   ............. B60R 21/34
DE    10 2011 103 533 A1    12/2011
(Continued)

OTHER PUBLICATIONS

English translation of CN 107433911; retrieved via PatentTranslate located at www.epo.org. (Year: 2023).*
(Continued)

*Primary Examiner* — Jason S Daniels
(74) *Attorney, Agent, or Firm* — Crowell & Moring LLP

(57) ABSTRACT

A cargo hold arrangement of a front chamber of a motor vehicle that is closable by a front bonnet includes a cargo hold box with a cargo hold and a cover. The cargo hold box is closed by the cover when the cover is disposed in a closed position below the front bonnet. The cover is movable downwards in relation to the cargo hold box in a vertical direction of the cargo hold box in an event of an accident of the motor vehicle. The cover is smaller in relation to a clear cross-section of the cargo hold box such that the cover is movable downwards in a vertical direction of the motor vehicle into the cargo hold of the cargo hold box in the event of the accident.

6 Claims, 3 Drawing Sheets

(58) Field of Classification Search
USPC ........................................................ 296/37.1
See application file for complete search history.

(56) References Cited

U.S. PATENT DOCUMENTS

| | | | |
|---|---|---|---|
| 10,800,458 B2 * | 10/2020 | Makowski | ............... B60J 10/86 |
| 2014/0008096 A1 | 1/2014 | Hudry et al. | |
| 2021/0039558 A1 * | 2/2021 | Rucker | ..................... E05D 7/12 |

FOREIGN PATENT DOCUMENTS

| | | |
|---|---|---|
| DE | 10 2017 004 263 A1 | 12/2017 |
| DE | 10 2018 206 316 A1 | 10/2019 |
| FR | 2 899 177 A1 | 10/2007 |

OTHER PUBLICATIONS

PCT/EP2020/080358, International Search Report dated Dec. 3, 2020 (Two (2) pages).

German-language German Office Action issued in German application No. 10 2019 007 850.0 dated Jan. 3, 2022 (Six (6) pages).

\* cited by examiner

CARGO HOLD ARRANGEMENT FOR A FRONT CHAMBER OF A MOTOR VEHICLE THAT CAN BE CLOSED BY A FRONT BONNET

BACKGROUND AND SUMMARY OF THE INVENTION

The invention relates to a cargo hold arrangement for a front chamber of a motor vehicle that can be closed by a front bonnet and a cargo hold arrangement for a front chamber of a motor vehicle that can be closed by a front bonnet.

Such cargo holds arranged in the front chamber are used in particular in passenger vehicles with electric drives, since sufficient space remains in the front chamber despite other components of the electric drive, due to the omission of the correspondingly large internal combustion engine usually provided. With such cargo holds, usually referred to in English as a "frunk" (front trunk), there are substantially two possibilities in order to close the cargo hold from above. One possibility is to also use the front bonnet for closing the front chamber of the motor vehicle to close the cargo hold. In doing so, however, a relatively complicated sealing concept emerges, since the front bonnet must thus not only tightly close the front chamber of the motor vehicle, but also the cargo hold arranged inside the front chamber. In addition, in doing so, increased sealing forces and higher demands of the front bonnet itself emerge.

A second possibility for closing the cargo hold is the use of a separate cover, which, in a closed position, is arranged below the front bonnet that can also be shifted between a closed position and an open position. When the front bonnet is open, this cover can be shifted from its closed position into an open position, whereby the cargo hold is accessible. In particular in terms of sealing the cargo hold from above by means of the separate cover, such a concept known from DE 10 2017 004 263 A1, for example, correspondingly has advantages over the solution in which the front bonnet closes the cargo space. However, in the event of a collision with a pedestrian on the front bonnet, it can result in blocking contact in the region of the cargo hold closed by the cover, even in the event of slight denting of the front bonnet.

The object of the present invention is to create a cargo hold arrangement of the kind mentioned at the start, which is formed particularly simply in terms of construction and moreover has particularly favorable crash properties, in particular in the event of a frontal collision of the motor vehicle with a pedestrian.

The cargo hold arrangement according to the invention is characterized in that the cover is formed in the shape of a car bonnet or in the shape of a trough and, in its closed position, protrudes upwardly beyond an upper edge region of the cargo hold box delimiting the loading opening, and in the event of a deformation of the front bonnet caused by an accident, the cover can be moved downwardly in the vertical direction of the vehicle in relation to the cargo hold box. The cover thus slips away downwardly in relation to the cargo hold box stationarily arranged at least in the closed position of the front bonnet and thus releases the deformation path for the front bonnet, such that the pedestrian is not held below the front bonnet by rigid structures or is only held later in the accident. Thanks to the design of the cargo hold arrangement according to the invention, the loads acting on the pedestrian can be reduced in certain pedestrian collision scenarios.

An exemplary embodiment of the cargo box arrangement is particularly preferred in which the cover is decoupled from the cargo space box, preferably completely, such that the cover can be freely shifted in relation to the cargo hold box. That is to say, the cover is not mounted or fixedly attached on the cargo hold box, but rather at another point, for example on the front bonnet.

In an advantageous exemplary embodiment of the cargo hold arrangement, it is provided that the car bonnet-shaped or trough-shaped cover formed similarly to a box has a peripheral collar protruding downwardly in the vertical direction of the vehicle (z-direction) from an upper cover wall.

According to a first exemplary embodiment, it is provided that such a collar protrudes into the cargo hold of the cargo hold box by an at least minimal amount even in the closed position of the cover and/or ensures a particularly favorable guide when the cover is moved downwards into the cargo hold of the cargo hold box as a result of an application of force caused by an accident in the vertical direction of the vehicle. Here, the cover thus plunges into the interior of the cargo hold box, wherein the upper cover wall nears a base of the cargo hold box with this relative movement. Here, it is provided in an advantageous embodiment that the cover is formed to be smaller in relation to a clear cross-section of the cargo hold box, whereby in the event of the cover shifting downwards in the vertical direction of the vehicle as a result of an accident, this can be moved into the cargo hold of the cargo hold box. For example, if it comes to a frontal collision of the motor vehicle with a pedestrian whose head hits the front bonnet in the region of the cover of the cargo hold box, then the risk of injury to the pedestrian can thus be considerably reduced, since the cover can correspondingly swerve into the cargo hold and can move. Here, it is required that the cover is formed to spring back or be smaller in relation to the clear cross-section of the cargo hold box, such that the cover cannot be blocked on the cargo hold box or similarly cannot be stopped in its movement.

According to a second embodiment, it is provided that, with a cover arranged in the closed position, its collar overlaps outwardly with an upper edge of the cargo hold box and that the upper cover wall is arranged at a distance apart from the upper edge of the cargo hold box. Here, the collar is quasi guided on the outside of the cargo hold box when the cover is shifted downwards due to a collision with a pedestrian. Here, the upper cover wall approaches the base of the cargo hold box, wherein in the further course of the shifting, this can result in a contact with the upper edge or edge region of the cargo hold box and the upper cover wall and thus optionally in a path boundary.

A further advantageous embodiment of the invention provides that the cover can be sealed off from an upper end face side of the cargo hold box via a peripheral seal. This enables, in particular, a particularly reliable seal of the cargo hold box by the cover, for example a seal against water ingress.

Alternatively or cumulatively, the cover in the closed position can also be sealed off from a wall of the cargo hold box on the peripheral side and oriented in the vertical direction of the vehicle via a peripheral seal, which is optionally the same seal with which the cover is also sealed off from the upper end face side of the cargo hold box. Such a seal also makes it possible, in particular, for the cover to be able to be shifted into the cargo hold box or the cargo hold delimited therein, caused by an accident, when it comes to an application of force from above caused by an accident.

In a particularly advantageous exemplary embodiment of the invention, it is provided that the cover of the cargo hold is held on the front bonnet and, when this is shifted between the closed position and the open position, the cover can also be shifted between its closed position and its open position. It is accordingly provided to provide a separate cover for the cargo hold box, which, however, is held on the front bonnet and, when this is shifted between the closed position and the open position, can also be correspondingly moved too. Accordingly, if the front bonnet is opened, then a shifting of the cover of the cargo hold box from its closed position into its open position is thus also carried out, whereby the cargo hold of the cargo hold box becomes accessible. Vice versa, the cargo hold box is closed by means of the cover if the front bonnet is shifted out of its open position into its closed position. The advantage of such a cargo hold arrangement is, in particular, that an extensively improved and simplified closure of the cargo hold box in comparison to a variant is made possible by the separate cover, in which variant the front bonnet carries out the closure of the cargo hold box. In particular, extensively simplified sealing concepts can here be used, whereby closure forces, for example, as a result of low sealing forces can also be considerably reduced. Here, the cover can be fastened on the underside of the front bonnet in a simple manner, for example. However, depending on the kinematics of the front bonnet, it would also be conceivable to mount the cover on the front bonnet by means of a corresponding kinematics system. However, in comparison to the rigid fixing of the cover, this is an obviously more complicated variant, even though it is also conceivable with correspondingly complicated kinematics in the front bonnet.

In a further design of the invention, the cover is fixed on an underside of the front bonnet. In doing so, a particularly simple design of the cargo hold arrangement emerges.

In a further design of the invention, the upper cover wall of the cover is arranged at a distance apart from the underside of the front bonnet via corresponding distancing means. This has the advantage that the head of the pedestrian can be particularly favorably protected in the event of a collision.

In this context, it has been shown to be further advantageous when the seal is arranged on the peripheral collar of the cover. In doing so, a particularly well-functioning seal emerges between the cover and the cargo hold box.

Finally, it has been shown to be advantageous when a clearance is maintained in an upper region of the cargo hold for the cover to move into in the event of an accident. Thus, the function of the cover is ensured in a particularly reliable manner when it shifts downwards in the vertical direction of the vehicle in the event of an accident.

Furthermore, to solve the object, a cargo hold arrangement is provided that has a front chamber that can be closed by a front bonnet that can be shifted between a closed position and an open position, in which front chamber a cargo hold box having a cargo hold is located. The cargo hold box can be closed either by means of a separate cover, which can be shifted either together with the front bonnet or independently of this between a closed position and an open position, or the front bonnet itself serves to close the cargo hold box, such that, in this case, no additional cover is necessary. Finally, it can be provided that a cover or covering element is integrated into the front bonnet, which closes a loading opening of the cargo hold box when the front bonnet is arranged in the closed position. The cargo hold arrangement is characterized in that the cargo hold box has at least one target failure point, which is designed in such a way that, in the case of a deformation of the front bonnet due to an accident, this supplies the cargo hold box with force after reaching a certain penetration depth, and when a defined threshold force is exceeded, the target failure point triggers when a defined threshold force is exceeded, by reducing the total height of the cargo hold box extending in the vertical direction of the vehicle. In other words, the cargo hold box can be quasi compressed in the event of a collision of a pedestrian in on or on the front bonnet by this if the target failure point is formed as a target deformation section. In this case, the deformation of the cargo hold box leads to energy absorption by reshaping, whereby the forces acting on the pedestrian can be further reduced. Optionally, in the further course of the deformation of the cargo hold box, it can still come to a breakage thereof. Alternatively, the target failure point can also be formed as a target break point, such that the cargo hold box breaks at this point after reaching the threshold force without previous deformation, and the at least two parts are moved at least in relation to each other and thus can release additional space. It is common to all design variants that, after triggering caused by a crash, in particular caused by a collision with a pedestrian, of the target failure point, the total height of the cargo hold box arranged below the front bonnet is reduced, such that the front bonnet is not blocked by the cargo hold box or is only blocked at a later point in time. The danger of injury to the pedestrian or the severity of the injury is correspondingly reduced.

Further advantages and details of the invention emerge from the description below of a preferred exemplary embodiment and by means of the drawings.

DETAILED DESCRIPTION OF THE DRAWINGS

Figure 1:
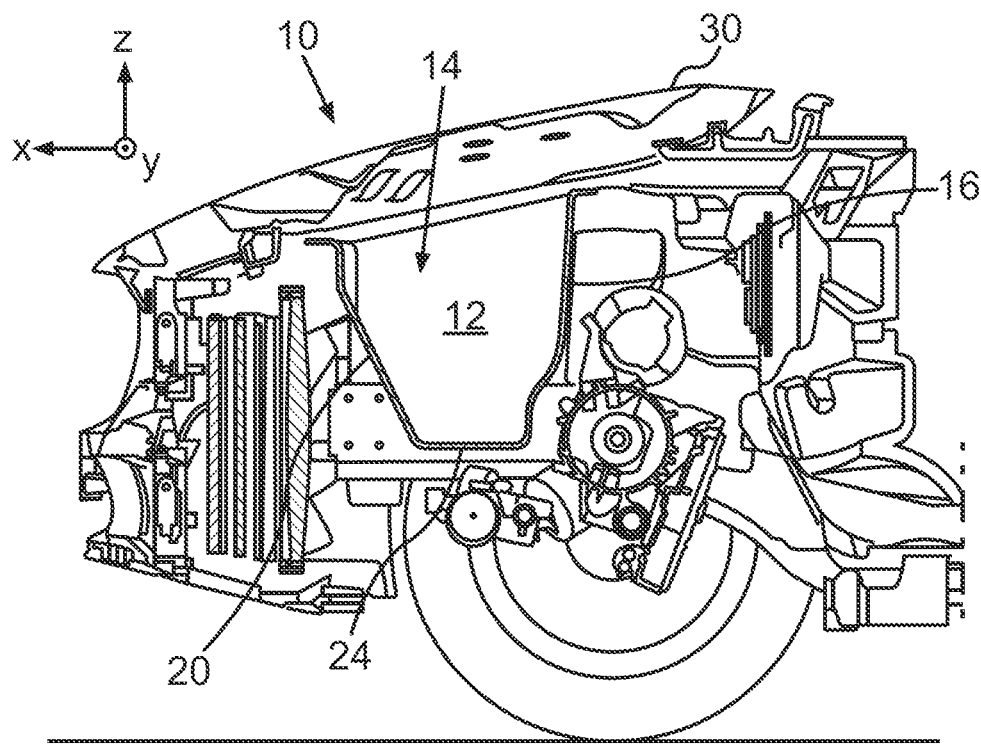
FIG. 1 is a cut-out sectional view of a front chamber of an electrically driven motor vehicle having a cargo hold box arranged below a front bonnet in its closed position, the cargo hold box being able to be closed by a cover held on the front bonnet and not depicted in FIG. 1, which is also shifted when the front bonnet is shifted between the closed position and the open position.
Figure 2:
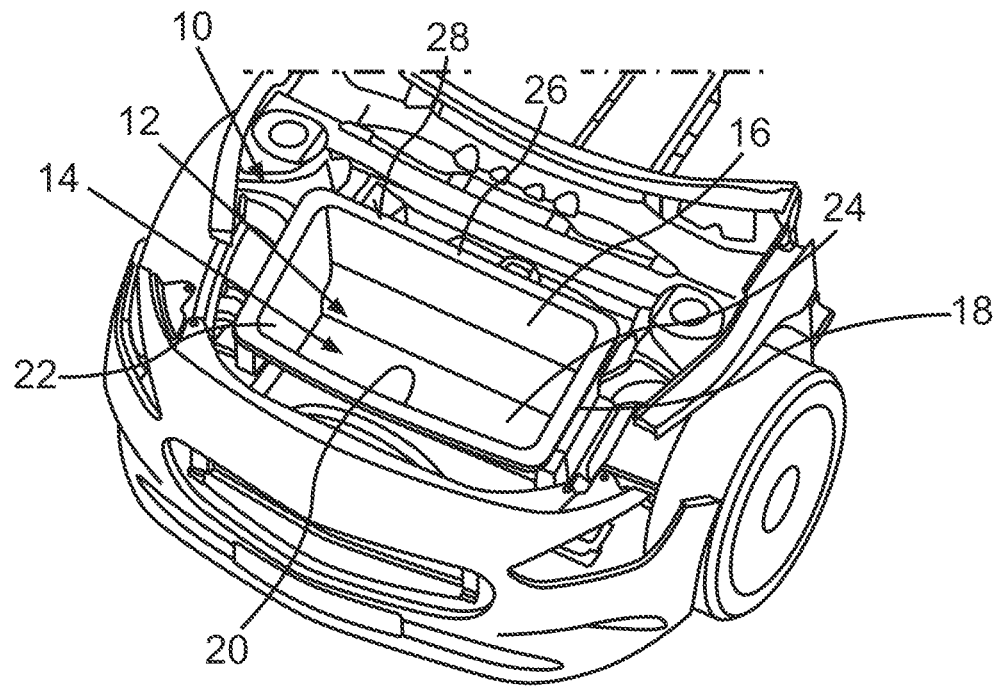
FIG. 2 is a sectional, perspective view obliquely from above of the front chamber of the motor vehicle according to FIG. 1 with the front bonnet omitted and with the cover of the cargo hold box omitted.

In FIGS. 1 and 2, a front chamber 10 is depicted in the region of a motor vehicle nose of a passenger vehicle. In the present case, the passenger vehicle is designed as a fully electrically driven passenger vehicle (BEV) or as a hybrid vehicle (PHEV). Thus, in the front chamber 10 of the passenger vehicle, space for a cargo hold 12 is correspondingly present, which is delimited on the side of the outer periphery and downwards by a trough-shaped cargo hold box 14 arranged immovably/stationarily in this exemplary embodiment. The cargo hold box 14 has a loading opening upwards, is presently formed at least substantially rectangularly in the clear cross-section and comprises respective walls 16, 18, 20, 22 running peripherally on the side of the outer periphery and extending at least substantially in the vertical direction of the vehicle, and a base 24. On its upper edge region 29, the cargo hold box 14 is provided with an outwardly offset peripheral frame 26, which has an end face side 28 facing towards a front bonnet 30. That is to say, the offset that is similar to a flange when seen in cross-section through the cargo hold box 14 on its upper edge region 29 has the end face side 29, the surface normal of which runs in principle, i.e., even when it encloses an angle of more than 0° and less than 180° with the vertical axis of the vehicle (z-axis), in the vertical direction of the vehicle.

The front chamber 10 can be closed by the front bonnet 30 arranged in its closed position in FIG. 1, which can be shifted from this closed position, for example in a rear end region, into an open position by means of corresponding mounting elements, in which the front bonnet 30 is positioned with a front end upwards. In FIG. 2, the front bonnet 30 has been left out for the sake of clarity.

Figure 3:
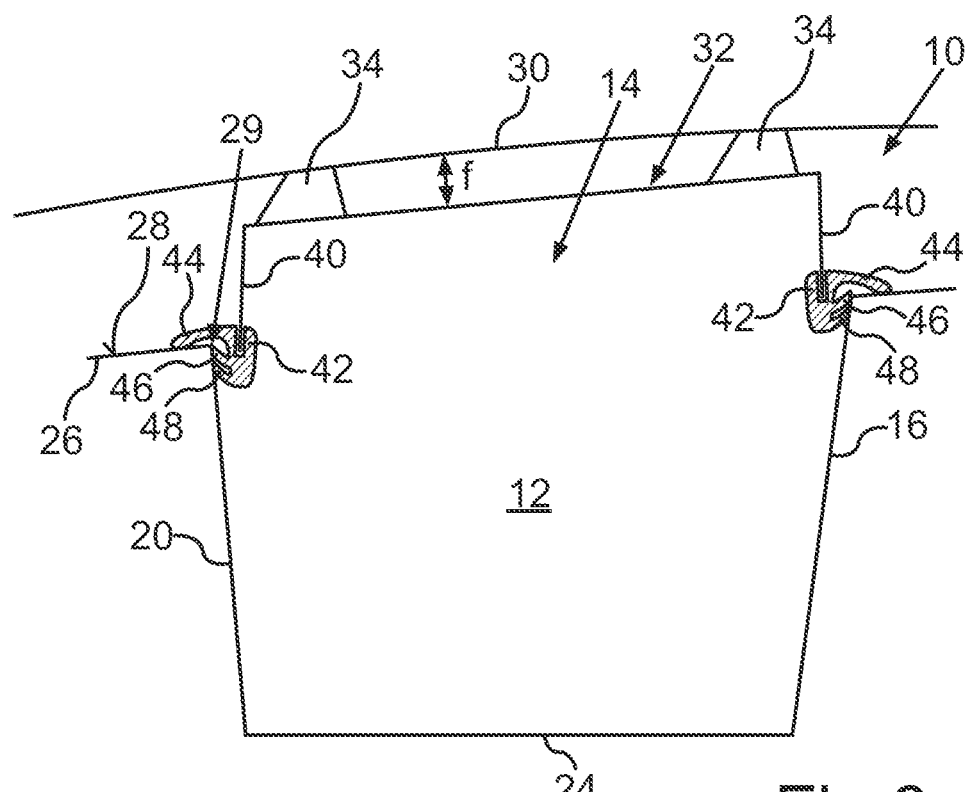
FIG. 3 is a schematic sectional view of the cargo hold arrangement according to FIGS. 1 and 2.

FIG. 3 shows a schematic sectional view of the cargo hold arrangement according to FIGS. 1 and 2 along a longitudinal plane of the motor vehicle running in the longitudinal direction of the vehicle (x-axis) or in the vertical direction of the vehicle (z-axis). A cover 32 emerges from FIG. 3, by means of which the cargo hold box 14 is closed in the closed position of the front bonnet 30. The cover 32 of the or for the cargo hold box 14 is here arranged below the front bonnet 30 in the closed position and, in the exemplary embodiment depicted here, is fixed on an underside of the front bonnet 30 via respective brackets 34. When the front bonnet 30 is shifted between its closed position shown in FIGS. 1 and 3 and an open position, the cover 32 is accordingly also able to be shifted between its closed position shown in FIGS. 1 and 3 and an open position. After opening the front bonnet 30, the cargo hold 12 of the cargo hold box 14 is thus directly accessible, that is to say for a person standing in front of the motor vehicle, since the cover 32 is also automatically in its open position.

Furthermore, it can also be seen from FIG. 3 that the cover 32 has an upper cover wall, which runs substantially in parallel to the underside of the front bonnet 30. A collar 40 protruding downwards in the vertical direction of the vehicle is formed peripherally around the cover wall on the side of the outer periphery, such that the cover is overall formed to be substantially box-shaped or trough-shaped.

Figure 4:
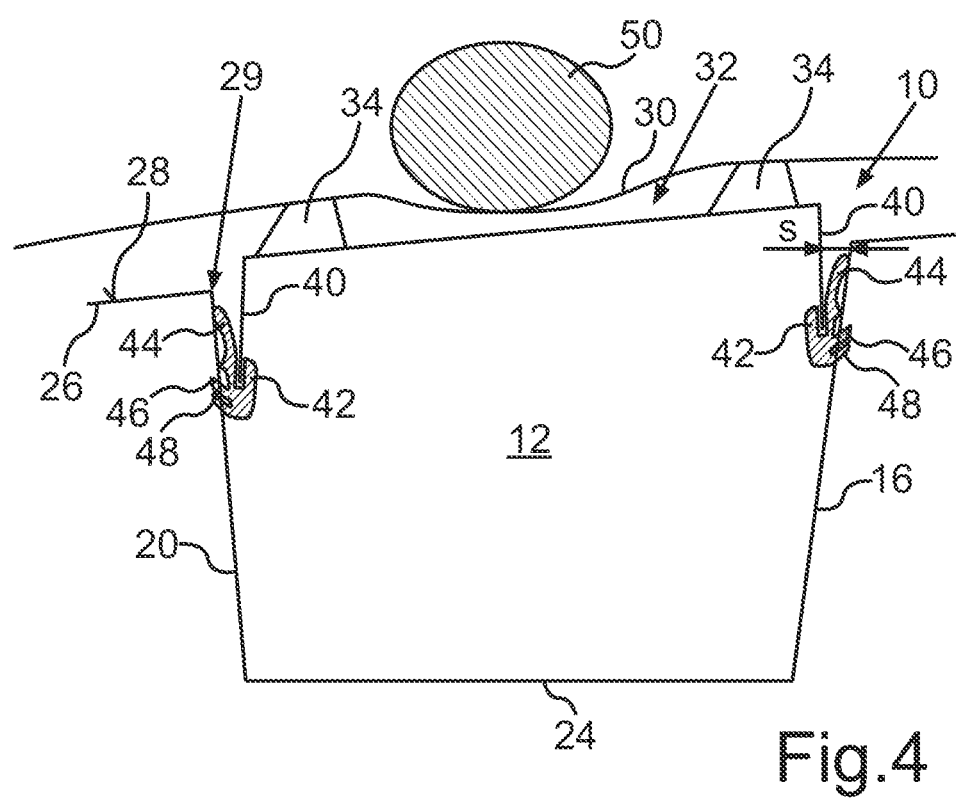
FIG. 4 is a further schematic sectional view of the cargo hold arrangement according to FIG. 3, wherein this is depicted after an application of force, caused by a crash, as a result of the collision with the head of a pedestrian.

Here, a substantial feature of the present cargo hold arrangement is that the cover 32 is formed to be smaller or to bounce back in relation to a clear cross-section of the cargo hold box 14, here substantially rectangular, and the collar 40 either already projects into the interior chamber of the cargo hold box in its closed position or, in the event of a reshaping of the front bonnet caused by an impact with a pedestrian and, accordingly, a corresponding shifting of the cover 32 in the direction of the base 24 of the cargo hold box 14 can quasi immerse/extend, whereby this can be moved into the cargo hold 12 of the cargo hold box 14 with a shift of the cover 32, caused by an accident, downwardly in the vertical direction of the vehicle, as is shown in FIG. 4 in a sectional view substantially analogous to FIG. 3. Accordingly, the cargo hold box 14 is formed to be larger in terms of cross-section than the cover 32 at least in an upper region in relation to a horizontal plane running in the longitudinal direction of the vehicle in the transverse direction of the vehicle, such that a gap s emerges at least substantially peripherally between the collar 40 of the cover 32 and the respective wall 16, 18, 20, 22 of the cargo hold box 14.

Furthermore, it can be seen from FIG. 3 that a seal is presently provided between the collar 40 of the cover 32 and the cargo hold box 14, such that the cargo hold box 14 is tightly sealed in the closed position of the cover 32. In the present case, its seal 42 running peripherally around on the collar 40 on the peripheral side is sealed both off from the upper end face side 28 of the cargo hold box 14 and to the respective wall 16, 18, 20, 22 of the cargo hold box 14 oriented in the vertical direction of the vehicle by means of respective sealing lips 44 or 46 and 48. It is clear that the seal 42 can optionally also only be carried out in relation to the end face side 28 or in relation to the walls 16, 18, 20 22 of the cargo hold box 14. Additionally, it is clear that the sealing lips 44, 46, 48 are formed correspondingly resiliently, such that the cover 32 can be moved downwards in the vertical direction of the vehicle in the event of an impact with a head impact of a head 50, schematically indicated in FIG. 4, of a pedestrian as a result of a frontal accident with them. It should be noted that at least the sealing lips 44 to 48 are formed to be resiliently elastic and, with a front bonnet arranged in the closed position and, accordingly, the cover 32 in the closed position, they are automatically sealingly applied to the corresponding wall 16 to 22 or the end face side 28 due to the restoring forces caused by the material.

Furthermore, it can be seen from FIG. 3 that a clearance for spacing is provided between the cover wall and the front bonnet 30, such that in the event of a pedestrian impact onto or on the front bonnet 30 in the covering region with the cargo hold box 14, the front bonnet 30 can additionally be deformed without it directly and immediately coming into contact with the upper wall of the cover. In combination with the shifting of the cover 32 into the cargo hold 12 of the cargo hold box 14, this resilience of the front bonnet 30 thus provides for a corresponding mitigation of the consequences of an impact of a pedestrian with their head 50 on the front bonnet 30 as a result of a frontal collision with the motor vehicle.

Figure 5:
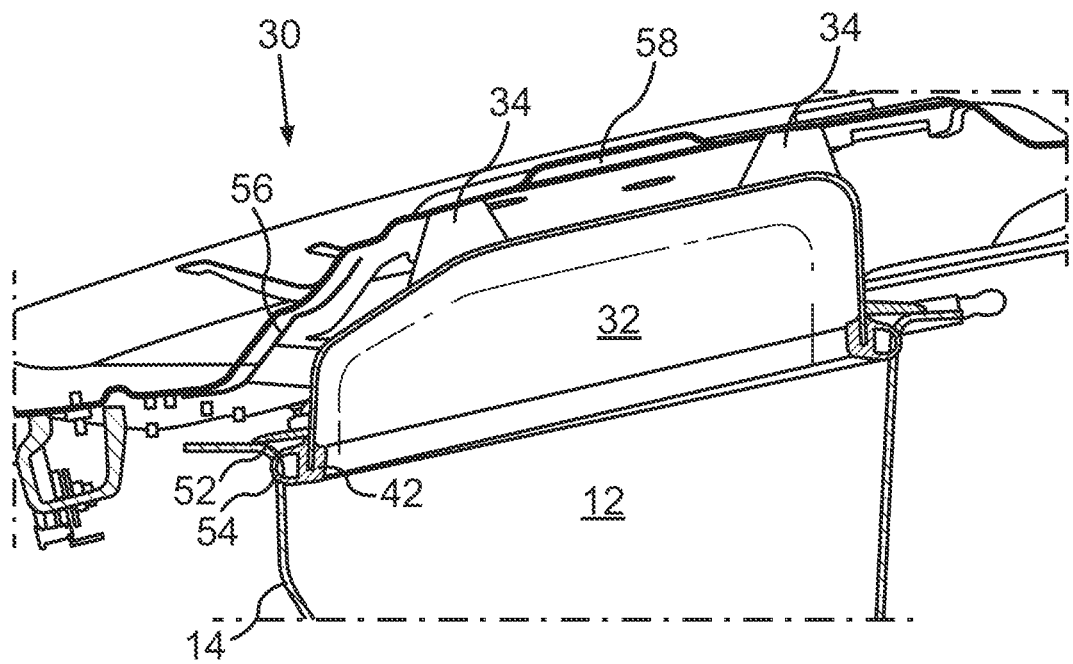
FIG. 5 is a cut-out sectional view of the cargo hold arrangement according to FIGS. 1 and 2.
Figure 6:
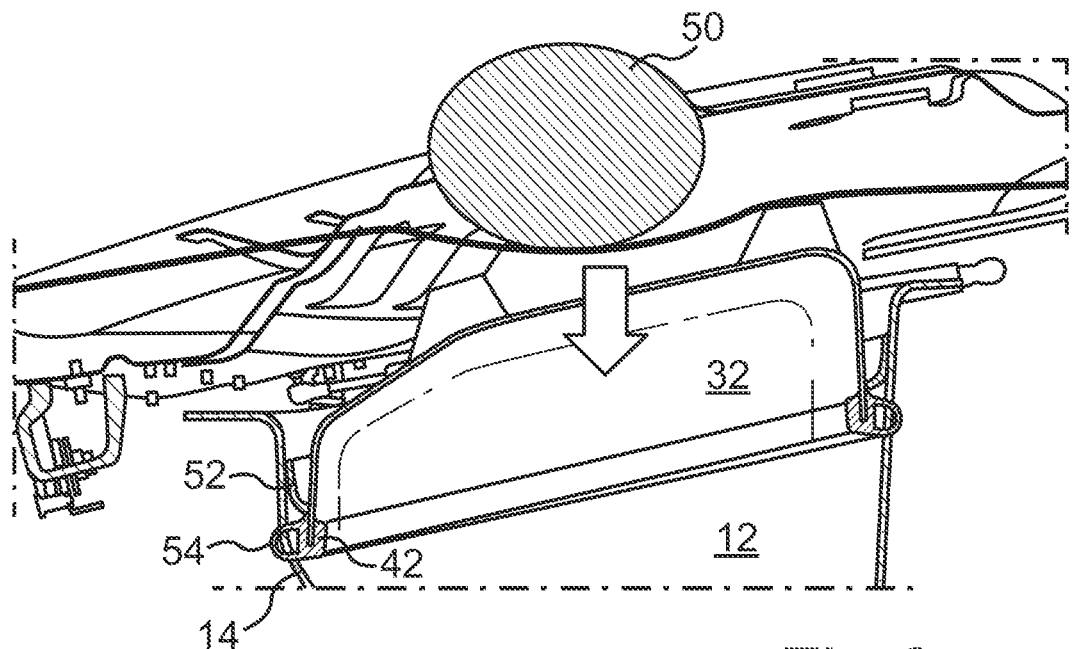
FIG. 6 is a cut-out sectional view of the cargo hold arrangement according to FIG. 5 after an application of force, caused by an accident, of a collision of the head of a pedestrian in the event of a frontal collision of the motor vehicle.

In a sectional view in each case, FIGS. 5 and 6 in turn show the cargo hold arrangement according to FIGS. 1 and 2 along a sectional plane running in the vertical direction of the vehicle or in the longitudinal direction of the vehicle. In particular, here the cargo hold box 14 and a concrete exemplary embodiment of the cover 32 and a further exemplary embodiment of the seal 42, which, in the present case, also seals with a sealing lip 52 to the upper end face side 29 and with a bead-shaped sealing portion 54 to the walls 16, 18, 20, 22 of the cargo hold box 14, can once again be seen. Here, FIG. 6 shows in which way the cover 32 with the seal 42 can be shifted into the cargo hold 12 of the cargo hold box 14. Here, the sealing portion 54 slides along the respective wall 16 to 22 of the cargo hold box 14 in the direction of the base 24. The sealing lip 52 here remains in continuous contact with the cargo hold box 14 and slides adjacently to thus via the rounded transition region between the end face side 28 and the walls 16 to 22.

Furthermore, it can be seen from FIGS. 5 and 6 that a lower part 56 of the front bonnet 30 has a recess or elevation 58, which is adjusted to the shape of the cover 32 or vice versa, i.e., the shape of the cover 32 is adjusted to the indentation on the inside of the front bonnet 30.

It is clear that, in the event of the cover 32 being shifted into the cargo hold 12 of the cargo hold box 14 due to an accident, a corresponding clearance must be provided in its upper region, into which the cover 32 can be moved. This clearance can preferably be kept free of goods.

It is also to be seen as included in the scope of the invention that the cover 32 does not necessarily have to be fixedly held on the underside of the front bonnet 30. A bracket on the underside of the front bonnet 30 in the sense of a mount would also be conceivable. This could be necessary, for example, if the front bonnet 30 has to be shifted in a more laborious movement mechanism between the closed position and the open position, which makes it necessary for the cover 32 to also carry out a more complicated movement.

The invention claimed is:

1. A cargo hold arrangement of a front chamber of a motor vehicle that is closable by a front bonnet, comprising:
    a cargo hold box with a cargo hold; and
    a cover, wherein the cargo hold box is closed by the cover when the cover is disposed in a closed position below the front bonnet and wherein the cover is shiftable out of the closed position into an open position where the cargo hold is accessible via a loading opening;
    wherein an entirety of the cover is smaller in relation to a cross-section of the cargo hold box taken along a horizontal plane through the cargo hold box in an upper region of the cargo hold box such that a gap exists peripherally between a peripheral collar of the cover which defines an outermost periphery of the cover and respective walls of the cargo hold box that extend upwardly in the vertical direction of the motor vehicle and such that the peripheral collar of the cover is movable downwards in the vertical direction of the motor vehicle into the cargo hold of the cargo hold box in an event of an accident.

2. The cargo hold arrangement according to claim 1, wherein the cover in the closed position is sealed off from an upper end face side of the cargo hold box via a peripheral seal.

3. The cargo hold arrangement according to claim 1, wherein the cover in the closed position is sealed off from the respective walls of the cargo hold box via a peripheral seal.

4. The cargo hold arrangement according to claim 1, wherein the cover is held on the front bonnet and when the front bonnet is shifted between a closed position and an open position the cover is shifted between the closed position of the cover and the open position of the cover.

5. The cargo hold arrangement according to claim 1, wherein an upper cover wall of the cover is disposed at a distance apart from the front bonnet.

6. The cargo hold arrangement according to claim 1, further comprising a seal that is disposed on the peripheral collar of the cover.

* * * * *